Figure 1:
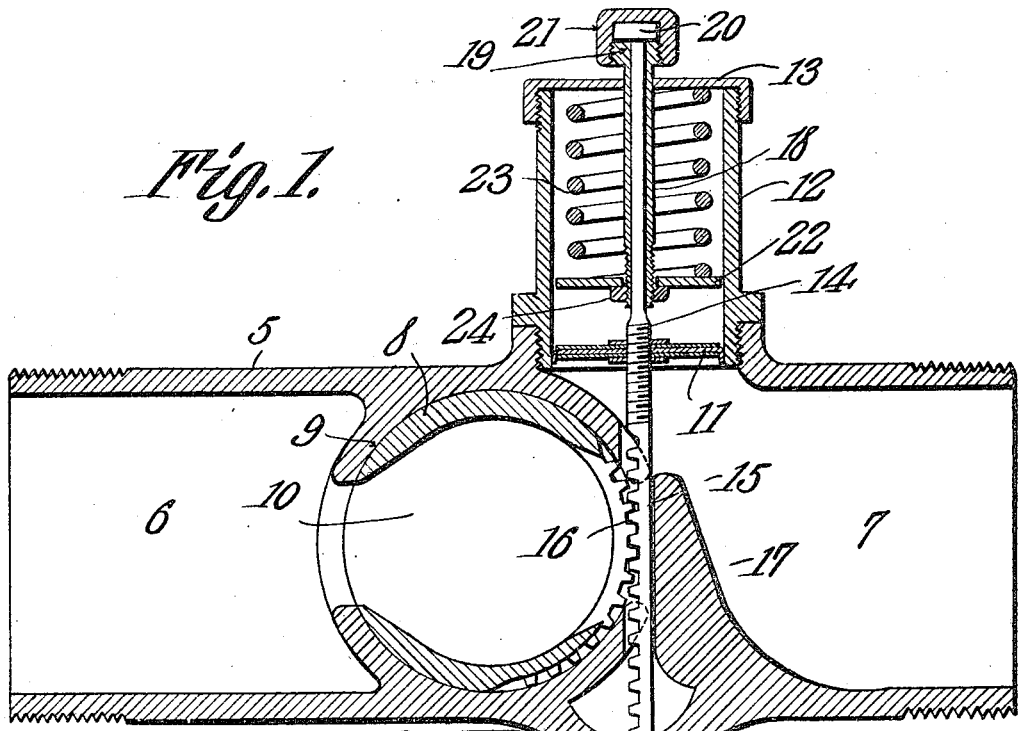

J. W. FOSTER.
PRESSURE RELIEF VALVE.
APPLICATION FILED FEB. 11, 1909.

960,302.

Patented June 7, 1910.

Witnesses

Inventor
Jackson W. Foster.
By
Attorneys

UNITED STATES PATENT OFFICE.

JACKSON W. FOSTER, OF JACKSONVILLE, FLORIDA, ASSIGNOR OF ONE-HALF TO ALBERT ENDEL AND ONE-FOURTH TO WALTER C. WARRINGTON, BOTH OF JACKSONVILLE, FLORIDA.

PRESSURE-RELIEF VALVE.

960,302.  Specification of Letters Patent.  Patented June 7, 1910.

Application filed February 11, 1909. Serial No. 477,306.

*To all whom it may concern:*

Be it known that I, JACKSON W. FOSTER, a citizen of the United States, residing at Jacksonville, in the county of Duval and State of Florida, have invented a new and useful Pressure-Relief Valve, of which the following is a specification.

This invention relates to pressure relief valves employed on fire hose to prevent bursting thereof when the pressure therein becomes excessive upon shutting off the nozzle; and the object of the present invention is to provide an improved valve of this kind which not only automatically shuts off the water when the pressure reaches a predetermined point, but also automatically turns it on again when the pressure drops below this point.

Another object of the invention is to provide a valve of the kind stated which is simple in structure, and efficient and reliable in action, and also one which is adjustable to different pressures.

With the foregoing objects in view, the invention consists in a novel construction and arrangement of parts, to be hereinafter described and claimed, reference being had to the drawing hereto annexed, in which—

Figure 2:
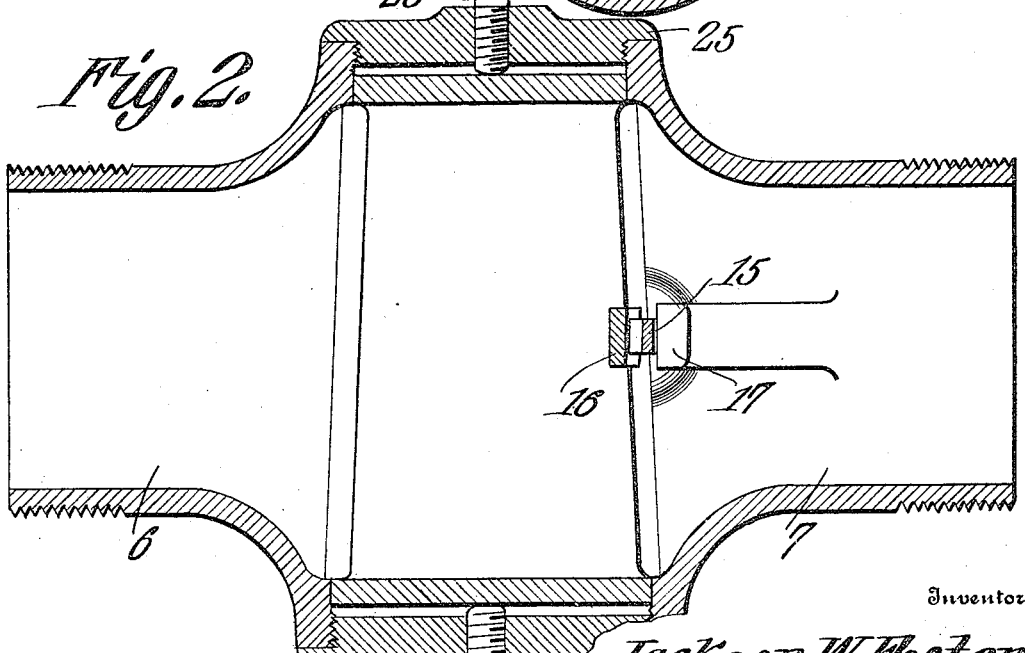

Figure 1 is a vertical sectional view of the valve. Fig. 2 is a horizontal section.

In the drawing, 5 denotes a valve casing having a longitudinal bore, one end 6 of which is the inlet, and the opposite end 7 is the outlet. Working transversely in the bore, between the inlet and outlet, is a turning plug 8. The interior of the valve casing is suitably shaped to form a seat 9 in which the turning plug works, and in the seat are ports, which are controlled by the plug, the latter having a transverse way or port 10.

On the outlet side of the valve is located a spring-pressed piston 11, which is operatively connected to the plug 8, in a manner and for a purpose to be presently described. The piston 11 works in a cylindrical chamber or casing 12, which screws into an opening in the wall of the valve casing adjacent the plug 8. If desired, the chamber may be formed integral with the valve casing. The outer end of the chamber is closed by a screw cap 13. The piston 11 is mounted on a rod 14, which is continued beyond the face thereof in the shape of a rack-bar 15, the teeth of which mesh with a toothed segment 16, extending across the outlet end of the port 10. By thus connecting the piston 11 to the plug 8, the latter is turned to shut the water off or on when the piston is actuated in a manner to be presently described.

In the bore of the valve casing is an abutment 17, engageable by the rack-bar 15, whereby the latter is guided, the rack-bar working between said abutment and the toothed segment.

Above the piston 11, a sleeve 18 is loosely mounted on the piston-rod 14. This sleeve, together with the piston-rod, extends through an opening in the cap 13, and the outer end of the sleeve is formed with a head or enlargement 19, the outer end of which is engaged by a head or enlargement 20 on the outer end of the piston-rod. The head 19 is screw-threaded to receive a cap 21, which fits over the head 20. A disk 22 is loosely mounted on the sleeve within the chamber 12, and between this disk and the cap 13 a coiled spring 23 is mounted. The disk 22 is held in place on the sleeve by a nut 24, screwed on the end thereof. Upon screwing the last mentioned nut up or down on the sleeve 18, the position of the disk 22 is changed thereon, whereby the tension of the spring 23 is adjusted.

In use, the inlet end 6 of the valve will be connected to the hydrant or fire engine, and the outlet end 7 will be connected to the fire hose, said ends of the valve being suitably screw-threaded, as shown, for this purpose. When the nozzle of the hose is open, the pressure is not sufficient to actuate the piston 11, and the plug 8 therefore remains in open position. When the nozzle of the hose is closed, there is a considerable increase of pressure in the valve, and when said pressure becomes greater than the tension of the spring 23, the piston 11 moves upwardly in the chamber 12, and, by reason of its connection with the plug 8, turns the same in a direction to shut off the water more or less, according to the amount of the excess pressure, the water being entirely shut off if the pressure rises sufficiently to move the piston the distance required to turn the plug to closed position. When the pressure drops, the spring 23 returns the piston, whereupon the plug 8 is rotated in a direction to turn on the water again. It will be therefore seen that the valve is automatic in its action in both shutting off and turning on the water. The valve may also be manually operated by taking hold of the cap 21 and moving the piston 11 up or down in the chamber 12.

The ends of the transverse bore in which the turning plug 8 works are closed by screw-caps 25 through each of which are threaded set screws 26 which engage the ends of said plug, whereby the latter is adjustably held in place.

What is claimed is—

1. In a relief valve a casing, a rotary valve therein having gear teeth, a spring-pressed piston exposed to the pressure, a rack-bar carried by the piston and meshing with the teeth of the valve, and an abutment in the casing behind the rack-bar, engageable thereby for guiding the same.

2. In a relief valve, a casing having a longitudinal bore, one end of which is the inlet, and the other end the outlet, a rotary valve working transversely in the bore between the inlet and the outlet, said valve having a transverse port, a toothed segment extending across one end of the port, a spring-pressed piston exposed to the pressure in the outlet end of the bore, and a rack bar carried by the piston, and meshing with the toothed segment.

In testimony that I claim the foregoing as my own, I have hereto affixed my signature in the presence of two witnesses.

JACKSON W. FOSTER.

Witnesses:
  J. H. RATHE,
  CHAS. STUMP.